United States Patent Office 2,769,784
Patented Nov. 6, 1956

2,769,784

ALKYLATED PHENOLS AND STABILIZED COMPOSITIONS COMPRISING SAME

David W. Young, Westfield, and Delmer L. Cottle, Highland Park, N. J., assignors to Esso Research and Engineering Company, a corporation of Delaware No Drawing. Application July 23, 1954,
Serial No. 445,475

10 Claims. (Cl. 252—52)

This invention relates to new alkoxy phenols and to their use as anti-oxidants for liquid or solid hydrocarbons, synthetic rubbers and resins, ethers, alcohols, esters and so forth. More particularly, the invention relates to novel antioxidants obtained by alkylating known phenolic materials such as para cresol with a chloromethyl ether of a higher alcohol, and especially with one or more mole equivalents of the chloromethyl ethers of a $C_8$ to $C_{13}$ oxo alcohol.

It is well known that many materials such as gasoline, lubricating oils, synthetic resins and elastomers require the addition of stabilizing agents to protect them against oxidation in storage or in actual use. Numerous antioxidants have been developed for this general purpose. However, it has been extremely difficult to prepare an antioxidant which would be simultaneously satisfactory in all important respects such as antioxidant effectiveness, color stability, low volatility, good solubility and so on. For instance, while 2,6-di-tert-butyl-4-methyl phenol has become one of the most popular antioxidants because of its high activity, it has the disadvantage of being fairly volatile and consequently susceptible to be lost during high temperature processing or service. On the other hand, when attempts were made to reduce this high volatility by alkylating the cresol nucleus with the dimer of isobutylene rather than isobutylene, these attempts proved only partially successful since the resulting compound, while showing the desired low volatility, also had a greatly reduced activity as an antioxidant. It is because of difficulties such as these that the search for better and cheaper materials continues. The present invention constitutes a valuable contribution in this search since it has produced a new class of highly active alkoxyphenol antioxidants which excell particularly with respect to color stability and low volatility.

The new antioxidants can be made by alkylating a phenolic compound with a chloromethyl ether of certain alcohols. The phenolic compounds suitable for such alkylation include phenol, alkylated phenols such as p-cresol, bis-hydroxyphenyl alkanes wherein the alkane may have 1 to 4 carbon atoms such as 2,2-di-(p-hydroxyphenyl)-propane, and alkoxyphenols having about 1 to 4 carbon atoms per alkoxy group such as 4-methoxyphenol. In other words, phenols useful in the preparation of the new class of antioxidants can be represented by the formula

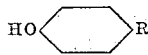

wherein R may be hydrogen, or an alkyl radical of 1 to 4 carbon atoms, or an alkoxy radical of 1 to 4 carbon atoms, or an alkyl phenol radical of 7 to 10 carbon atoms, as well as the corresponding homologs containing one additional substituent such as a chlorine atom or a $C_1$ to $C_4$ alkyl group. Thus, besides the specific compounds already mentioned, it is possible to use p-ethyl phenol, p-isopropyl phenol, p-ethoxy phenol, 2-chloro-4-methyl phenol, 2,2-bis-(4-hydroxy-5-methyl phenyl) butane, and so forth.

The other main reagent is a chloromethyl ether of an aliphatic alcohol of about 8 to 15 carbon atoms. Oxo alcohols prepared by oxonation of $C_7$ to $C_{12}$ olefins are particularly preferred. Such oxo alcohols as well as the oxo reaction used for preparing them are well known by themselves and need not be further defined here. In general the oxo alcohols are actually isomeric mixtures of alcohols having a given number of carbon atoms and these alcohols are usually substantially more branched and in some ways more reactive than alcohols of the same number of carbon atoms but derived from other sources. In other words, oxo alcohols generally are isomeric mixtures of alcohols which contain at least one tertiary carbon atom per molecule and wherein at least 60% of the isomers contain two tertiary carbon atoms. Thus, oxo octyl chloromethyl ether and oxo tridecyl chloromethyl ether are representative of alkylating agents particularly useful in the present invention. Applying an otherwise well known method of synthesis, the chloromethyl ether is prepared by passing hydrogen chloride into a slurry of the alcohol and paraformaldehyde, usually at 0° to 10° C., separating the aqueous layer of hydrochloric acid formed, and blowing the oily product with an inert gas to free it of hydrogen chloride if desired.

For purposes of the invention, dialkylated products are preferred in which the alkoxy groups have been alkylated onto the phenolic nucleus in the 2- and 6-position with respect to the hydroxyl group. The highly branched structure of the particular alkoxy groups used herein, when present in the 2- and 6-positions, has been found unusually effective in creating steric hindrance for the hydroxyl group of the phenol molecule. Consequently the phenol is less reactive with other materials such as sodium hydroxide while at the same time being highly active as an antioxidant. However, while the dialkylate products are preferred, monoalkylated products having at least one highly branched, oxo derived alkoxy group on one of the carbons adjacent to the hydroxyl group of the phenol nucleus are also highly effective for many purposes. About 1 to 2 moles of the ether are usually reacted with each mole of the phenol. Accordingly, the compounds of the present invention can be represented by the formula

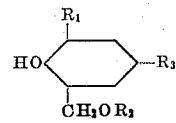

wherein $R_1$ is selected from the group consisting of hydrogen and —$CH_2OR_2$ radicals, $R_2$ being a branched-chain oxo derived alkyl radical of 8 to 15 carbon atoms, and $R_3$ is selected from the group consisting of alkyl radicals of 1 to 4 carbon atoms, alkoxy radicals of 1 to 4 carbon atoms and alkyl phenol radicals represented by the structure

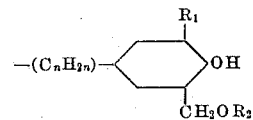

where $n$ is an integer ranging from 1 to 4 and $R_2$ is an oxo derived radical as defined above.

The alkylation reaction as such is carried out in an otherwise well known manner. Thus, preferably, the chloromethyl ether which is the alkylating agent is gradually added to the phenol in approximately stoichiometric proportions at a temperature of about 35 to 100° C. in the presence of a suitable Friedel-Crafts catalyst such as aluminum chloride, boron trifluoride, zinc chloride and the like. However, in a dry system the alkylation will take place even without any catalyst being added.

The resulting monoalkoxy- or dialkoxyphenols or bisphenols may then be added in antioxidant amounts to the materials to be protected. Depending on the particular alkoxyphenol and material to be stabilized, as well as depending on the ultimate use to which the stabilized composition is to be put, the latter will be compounded to contain about 0.001 to about 5 weight percent of the alkoxyphenol. The addition may be effected in any suitable manner, e. g. by simple mixing in the case of a liquid hydrocarbon, by compounding on a rubber mill in the case of a solid elastomer, and so on. The antioxidants are particularly effective in hydrocarbon compositions such as gasoline, mineral lubricating oil, synthetic hydrocarbon drying oils, such as those described in Patent 2,652,342, solid polyisobutylene, resinous polyethylene, natural rubber and GR-S as well as GR-I type synthetic rubber. However, useful results are also obtained by adding the new antioxidants to other types of material such as lard and animal or vegetable fats in general, alcohols such as $C_8$ to $C_{15}$ oxo alcohols, ethers, esters such as diisooctyl phthalate or phosphate, vitamins, liquid or resinous polyesters such as acrylates, resinous vinyl chloride polymers and copolymers, e. g. the well known vinyl chloride-acetate copolymers, and oil-resistant elastomers such as neoprene and butadiene-acrylonitrile copolymers.

To illustrate the invention still further, specific examples are given below. It will be understood throughout this specification and the appended claims that all ratios and percentages of materials are expressed on a weight basis, unless otherwise indicated.

*Example I*

496 grams (2 moles) of chloromethyl ether of $C_{13}$ oxo alcohol, $C_{13}H_{27}OCH_2Cl$, was added slowly to 108 g. p-cresol. 10 grams of aluminum chloride catalyst was added to the mixture and the reaction temperature was held at 40° to 90° C. for five hours. At the end of the run the product was washed with 10% $KHCO_3$ solution and then with water. Upon drying this product was found to have a molecular weight of 542.4 and 544.2 in a duplicate test, as against a theoretical weight of 544. The sample checked theory for carbon, hydrogen and oxygen content. This new product had the following structure

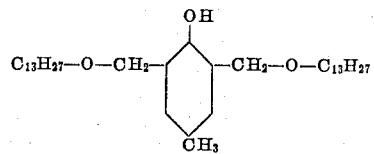

The product had a boiling point above 210° C. at 3 mm. Hg.

When this product was evaluated in "Esso Extra" premium grade motor gasoline base stock in a concentration of 2 lbs. per 5,000 gal. it gave a breakdown time of 285 minutes in the A. S. T. M. breakdown test. In the same test 2,6-di-t-butyl-4-methyl phenol, which is one of the best gasoline antioxidants known, gave a breakdown time of 275 minutes, being slightly less effective than the novel alkoxyphenol. Of course, the protection afforded by the novel alkoxyphenol is far more permanent than that of the dibutyl cresol, in view of the much greater molecular weight and hence lower volatility of the former.

*Example II*

178 grams (one mole) of $C_8$ oxo alcohol chloromethyl ether, $C_8H_{17}OCH_2Cl$, was alkylated on 124 grams (one mole) of 4-methoxy phenol. 2 g. $AlCl_3$ was added as catalyst and the temperature of the mixture was held at 40–60° C. for seven hours. At the end of this time the product was well washed with water, and dried. The alkylated 4-methoxy phenol had a molecular weight of 260 (theory 266), a carbon content of 72.1%, hydrogen content of 9.76%. When this sample was evaluated in "Esso Extra" premium gasoline base stock at a concentration of 2 lbs. per 5,000 gal., a breakdown time of 440 minutes was obtained in the A. S. T. M. tests. The blank gasoline had a breakdown time of 135 minutes.

*Example III*

One mole of ordinary phenol was alkylated with one mole of $ClCH_2OC_{13}H_{27}$, and then the product treated in the otherwise conventional manner with $SCl_2$, etc., to form a diphenol sulfide having the formula:

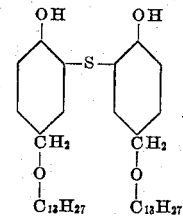

This diphenol sulfide can be used as a highly effective antioxidant in mineral oils. Also, the barium or calcium salts may be made of these sulfurized phenols to form the corresponding alkaline earth metal soaps which are valuable additives for oils.

*Example IV*

Results showing the comparative effectiveness of these products in mineral oil, as determined in the S. O. D. Laboratory high temperature Aluminum Cup Test are recorded in Table I. In this test 10 g. of oil are placed in a 400 ml. aluminum cup and heated to 800° F. in open air for 30 minutes. After cooling the weight of the coke deposit is determined. The oil used in this series of tests was a high quality paraffinic lubricating oil having a viscosity index of about 115 and a viscosity of 43 SSU at 210° F. In one test no additive at all was used, while in the other four tests 0.25% of the various antioxidants listed in the table were added.

TABLE I

| Test | Additive | mg. Coke |
|---|---|---|
| 1 | None | 40 |
| 2 | 2,6-Di-tert-butyl-4-methyl phenol | 31 |
| 3 | Product of Example I | 17 |
| 4 | Bis-(2-hydroxy-3-tert-butyl-5-methyl phenyl) methane | 14 |
| 5 | Product of Example II | 7 |

It is apparent that in this test the novel antioxidant of Example II was particularly outstanding, greatly exceeding all other antioxidants tested.

*Example V*

The above products of Examples I and II were also evaluated as antioxidants in a commercial grease by the Norma Hoffman oxidation test at 100° C. That grease consisted essentially of about 65% mineral oil having a viscosity of 55 SSU at 210° F., 29% rape seed oil, 5% NaOH and 1% of a concentrate comprising a sodium sulfonate of a petroleum oil having a molecular weight of 450 dissolved in a mineral oil, said concentrate containing 25% of the sulfonate by weight. The results are listed in Table II.

TABLE II

*Norma Hoffman oxidation test at 100° C. in grease*

| Test | Anti-Oxidant | | Time in Hrs. to a Pressure Drop, #/in.² | | | | |
|---|---|---|---|---|---|---|---|
| | Compound Added | Concentration, Percent | 5 | 10 | 15 | 20 | 25 |
| 1 | None | None | 30 | 52 | 77 | 89 | 130 |
| 2 | Product of Ex. I | 0.5 | 70 | 128 | 155 | 175 | 210 |
| 3 | Product of Ex. II | 0.5 | 57 | 95 | 134 | 160 | 200 |
| 4 | 2,2-di-(p-hydroxy-phenyl) propane alkylated with 1 mole of ClCH₂OC₁₃H₂₇. | 0.5 | 50 | 78 | 92 | 128 | 150 |

The great effectiveness of the novel antioxidants in greases is evident from the above.

*Example VI*

Results showing the comparative effectiveness of the novel antioxidants in solid polyisobutylene having a Staudinger molecular weight of 100,000 are recorded in Table III.

TABLE III

| Test | Anti-Oxidant | | Percent Loss in M. Wt. of Polymer After Being Held in Air Oven at 110° C. for 12 Days |
|---|---|---|---|
| | Compound Added | Concentration, Percent | |
| 1 | None | None | 58 |
| 2 | 2,6-di-tert-butyl-4-methyl phenol | 0.5 | 17 |
| 3 | Product of Ex. I | 0.5 | 12 |
| 4 | Product of Ex. II | 0.5 | 22 |

In this case the product of Example I showed up particularly well.

The results generally show that the novel alkoxyphenols derived from oxo alcohols are unusually effective antioxidants in a wide variety of materials.

Having described the general nature and illustrative embodiments of the invention, its scope and spirit are particularly pointed out in the appended claims.

What is claimed is:

1. A phenolic anti-oxidant having the formula

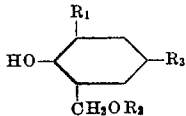

wherein $R_1$ is selected from the group consisting of hydrogen and —CH₂OR₂ radicals, $R_2$ is a branched-chain alkyl radical of 8 to 15 carbon atoms, and $R_3$ is selected from the group consisting of alkyl radicals of 1 to 4 carbon atoms, alkoxy radicals of 1 to 4 carbon atoms, and alkyl phenol radicals represented by the structure

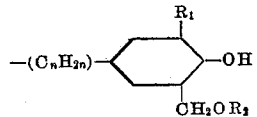

where $n$ is an integer ranging from 1 to 4 and $R_2$ is an alkyl radical of 8 to 15 carbon atoms.

2. A phenolic anti-oxidant having the formula

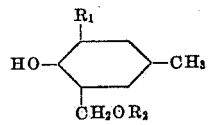

wherein $R_1$ is selected from the group consisting of hydrogen and —CH₂OR₂ radicals and $R_2$ is a highly branched alkyl radical derived from an isomeric mixture of C₈ to C₁₃ alcohols containing at least one tertiary carbon atom, at least 60% of the isomers containing two tertiary carbon atoms.

3. A phenolic anti-oxidant having the formula

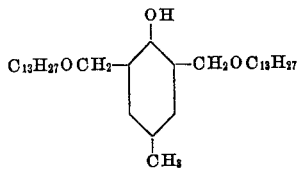

4. A process for making phenolic anti-oxidants which consists essentially of condensing one mole of a hydroxyaromatic compound selected from the group consisting of phenol and para-cresol in the presence of a Friedel-Crafts catalyst with one to two moles of a chloromethyl alkyl ether wherein said alkyl group is derived from a C₈ to C₁₅ alcohol.

5. A process according to claim 4 wherein aluminum chloride is used as catalyst and wherein the chloromethyl alkyl ether and the hydroxyaromatic compound are used in a ratio of about 2:1.

6. A stabilized composition containing an oxidation-susceptible hydrocarbon admixed with 0.001 to 5% of a phenolic anti-oxidant having the formula

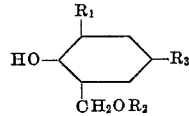

wherein $R_1$ is selected from the group consisting of hydrogen and —CH₂OR₂ radicals, $R_2$ is a branched chain alkyl radical of 8 to 15 carbon atoms, and $R_3$ is selected from the group consisting of alkyl radicals of 1 to 4 carbon atoms, alkoxy radicals of 1 to 4 carbon atoms and alkyl phenol radicals represented by the structure

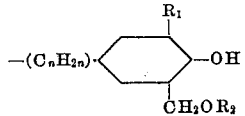

where $n$ is an integer ranging from 1 to 4.

7. A composition according to claim 6 wherein said hydrocarbon is a solid.

8. A composition according to claim 6 wherein the hydrocarbon is a solid hydrocarbon polymer and the anti-oxidant has the formula

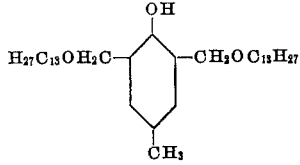

and wherein said C₁₃H₂₇ radicals of the phenolic molecule are derived from a corresponding branched C₁₃ alcohol.

9. A composition according to claim 6 wherein said hydrocarbon is normally a liquid.

10. A composition according to claim 6 wherein the hydrocarbon is a paraffinic lubricating oil and the antioxidant is a phenol having the formula

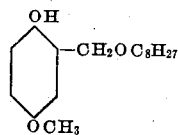

and wherein the $C_8H_{17}$ radical of the phenolic molecule is derived from a corresponding highly branched octyl alcohol.

References Cited in the file of this patent

UNITED STATES PATENTS

| | | |
|---|---|---|
| 2,488,134 | Mikeska et al. | Nov. 15, 1949 |
| 2,668,862 | Price | Feb. 9, 1954 |

OTHER REFERENCES

"Phenolic Antioxidants for Paraffinic Materials," Morawetz, I. and E. Chem., vol. 41, No. 7, pp. 1442–1447.